DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 22, 1974

918 O.G. 1329

T918,013

NATURAL SELECTION PROGRAM WITH RADOMIZATION TRAFFIC-JAM MECHANISM

Bradford Dunham, White Plains, and James H. North, Yorktown Heights, N.Y., assignors to International Business Machines Corporation, Armonk, N.Y.

Filed June 28, 1973, Ser. No. 374,620

Int. Cl. G06f *7/00*

U.S. Cl. 444—1

4 Sheets Drawing. 17 Pages Specification

The present invention relates to an automatic process for preventing a "natural selection" design automation computer program that is optimizing a specified objective function, for example, the location of a plurality of objects, from becoming permanently "stuck" at an unsatisfactory local minimum. The innovation presented in the disclosure is in the application of a novel "traffic-jam" routine which enables the optimization process to continue after it has reached such a local minimum. This routine operates most effectively in certain traffic-jam situations caused by unrecognized coalitions of objects where it is difficult to recognize the coalitions in question and difficult to maneuver them when unrecognized. Such coalitions can be broken up by an appropriate randomization of certain subsets of the total data, the subsets in question being demonstrably of high relevance to those unrecognized coalitions whose incorrect location has caused the unsatisfactory local minimum to be reached. The normal natural selection process may then continue to a more successful point even though the coalitions themselves remain unrecognized.

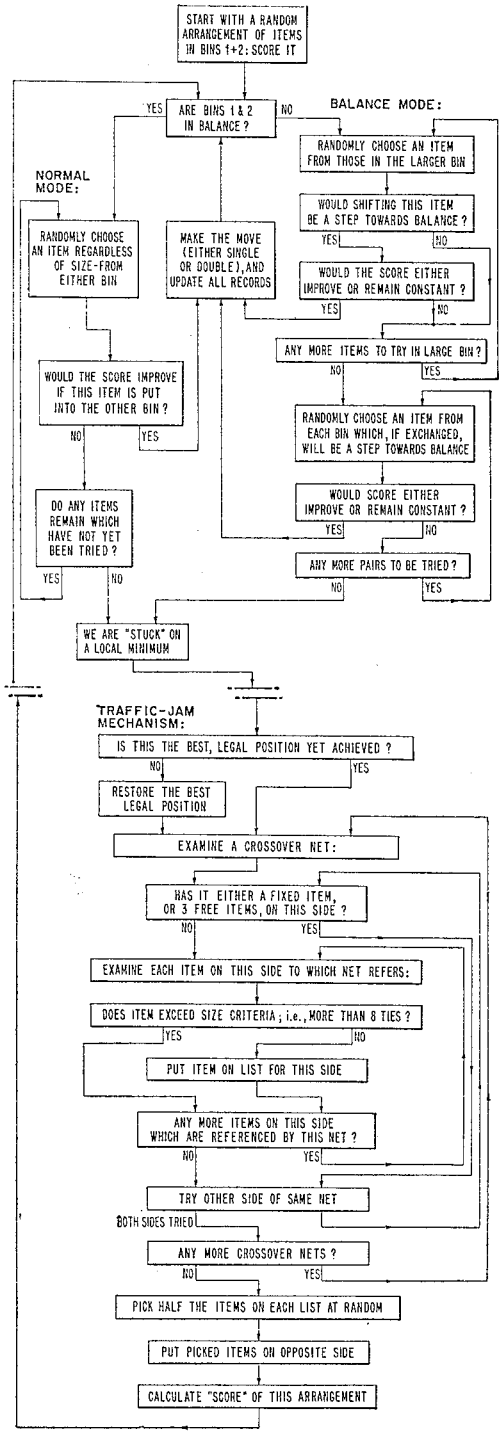

Figures 1, 1A:
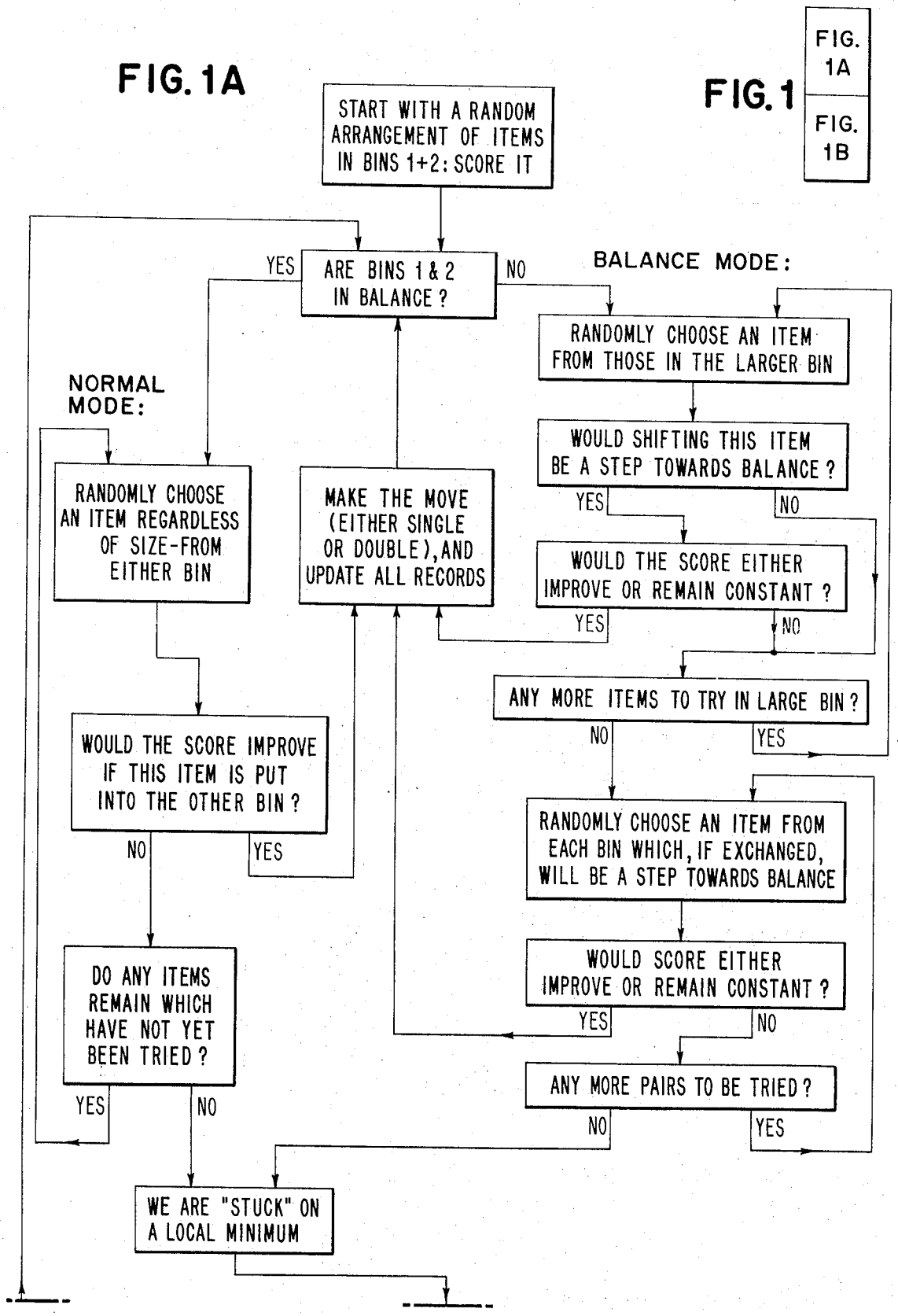
Figure 2:
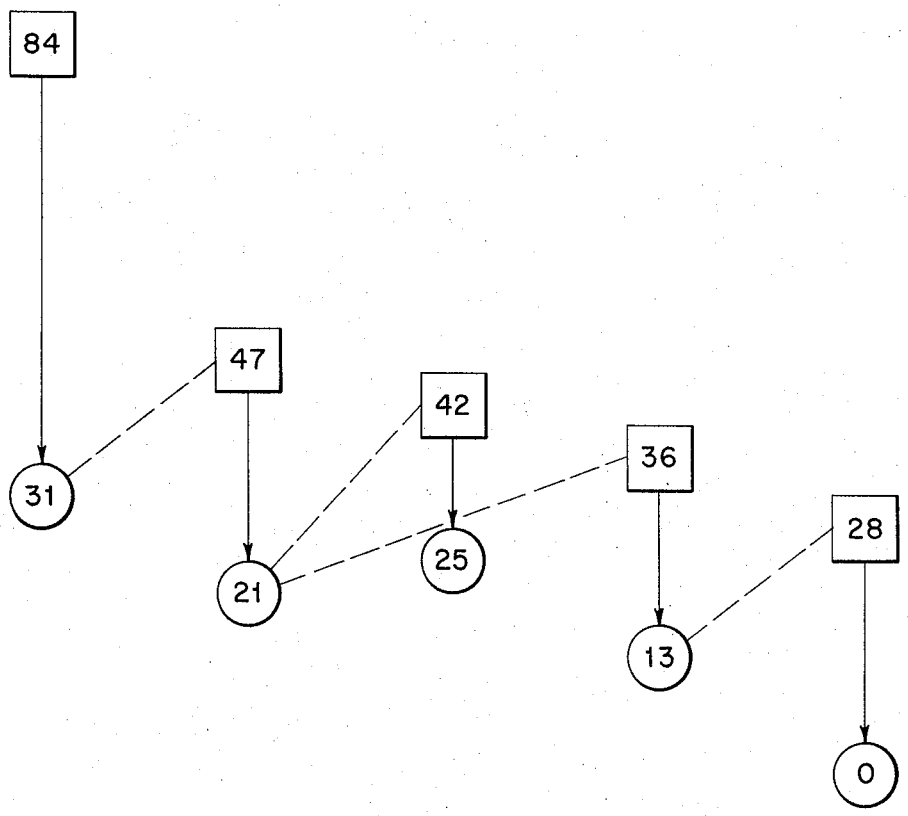

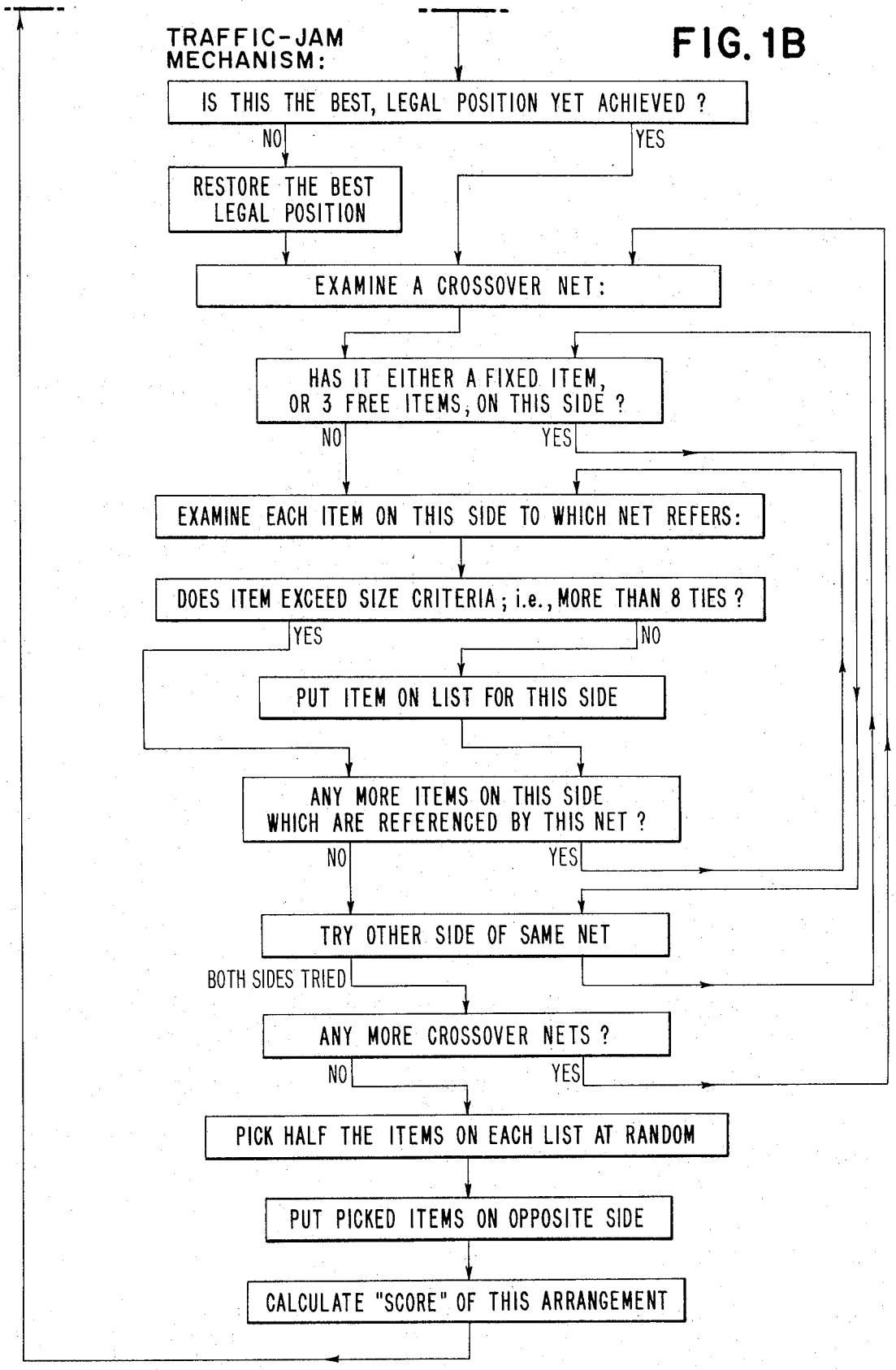
TRAFFIC-JAM MECHANISM:
FIG. 1B
IS THIS THE BEST, LEGAL POSITION YET ACHIEVED ?
NO
YES
RESTORE THE BEST LEGAL POSITION
EXAMINE A CROSSOVER NET:
HAS IT EITHER A FIXED ITEM, OR 3 FREE ITEMS, ON THIS SIDE ?
NO
YES
EXAMINE EACH ITEM ON THIS SIDE TO WHICH NET REFERS:
DOES ITEM EXCEED SIZE CRITERIA; i.e., MORE THAN 8 TIES ?
YES
NO
PUT ITEM ON LIST FOR THIS SIDE
ANY MORE ITEMS ON THIS SIDE WHICH ARE REFERENCED BY THIS NET ?
NO
YES
TRY OTHER SIDE OF SAME NET
BOTH SIDES TRIED
ANY MORE CROSSOVER NETS ?
NO
YES
PICK HALF THE ITEMS ON EACH LIST AT RANDOM
PUT PICKED ITEMS ON OPPOSITE SIDE
CALCULATE "SCORE" OF THIS ARRANGEMENT

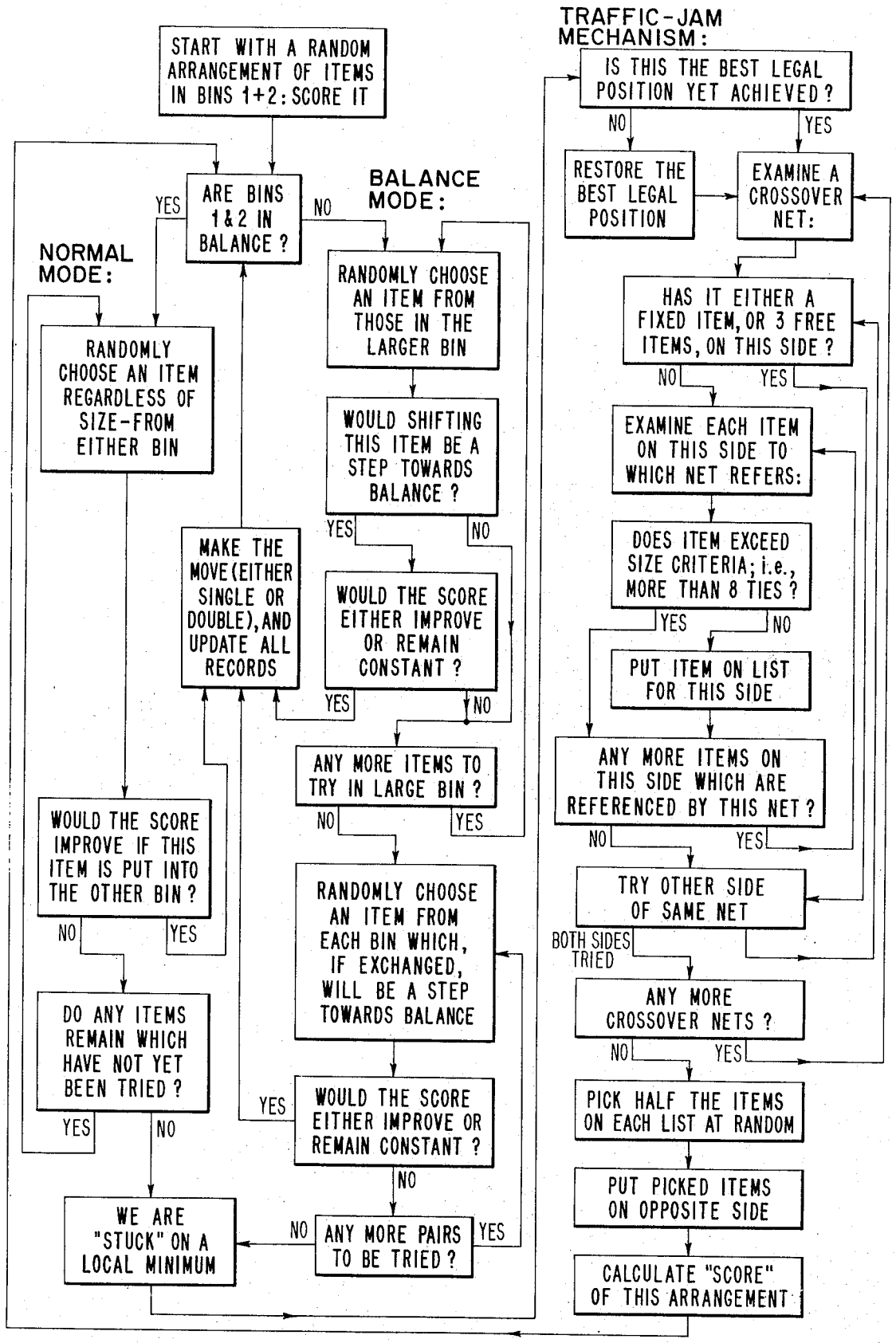
START WITH A RANDOM ARRANGEMENT OF ITEMS IN BINS 1+2: SCORE IT
ARE BINS 1 & 2 IN BALANCE ?
YES
NO
NORMAL MODE:
RANDOMLY CHOOSE AN ITEM REGARDLESS OF SIZE-FROM EITHER BIN
WOULD THE SCORE IMPROVE IF THIS ITEM IS PUT INTO THE OTHER BIN ?
NO
YES
DO ANY ITEMS REMAIN WHICH HAVE NOT YET BEEN TRIED ?
YES
NO
WE ARE "STUCK" ON A LOCAL MINIMUM
BALANCE MODE:
RANDOMLY CHOOSE AN ITEM FROM THOSE IN THE LARGER BIN
WOULD SHIFTING THIS ITEM BE A STEP TOWARDS BALANCE ?
YES
NO
WOULD THE SCORE EITHER IMPROVE OR REMAIN CONSTANT ?
YES
NO
MAKE THE MOVE (EITHER SINGLE OR DOUBLE), AND UPDATE ALL RECORDS
ANY MORE ITEMS TO TRY IN LARGE BIN ?
NO
YES
RANDOMLY CHOOSE AN ITEM FROM EACH BIN WHICH, IF EXCHANGED, WILL BE A STEP TOWARDS BALANCE
WOULD THE SCORE EITHER IMPROVE OR REMAIN CONSTANT ?
YES
NO
ANY MORE PAIRS TO BE TRIED ?
NO
YES
TRAFFIC-JAM MECHANISM:
IS THIS THE BEST LEGAL POSITION YET ACHIEVED ?
NO
YES
RESTORE THE BEST LEGAL POSITION
EXAMINE A CROSSOVER NET:
HAS IT EITHER A FIXED ITEM, OR 3 FREE ITEMS, ON THIS SIDE ?
NO
YES
EXAMINE EACH ITEM ON THIS SIDE TO WHICH NET REFERS:
DOES ITEM EXCEED SIZE CRITERIA; i.e., MORE THAN 8 TIES ?
YES
NO
PUT ITEM ON LIST FOR THIS SIDE
ANY MORE ITEMS ON THIS SIDE WHICH ARE REFERENCED BY THIS NET ?
NO
YES
TRY OTHER SIDE OF SAME NET
BOTH SIDES TRIED
ANY MORE CROSSOVER NETS ?
NO
YES
PICK HALF THE ITEMS ON EACH LIST AT RANDOM
PUT PICKED ITEMS ON OPPOSITE SIDE
CALCULATE "SCORE" OF THIS ARRANGEMENT